(12) United States Patent
Roh et al.

(10) Patent No.: US 6,249,517 B1
(45) Date of Patent: Jun. 19, 2001

(54) APPARATUS FOR SUPPORTING A VARIETY OF TRANSMISSION RATES IN SPREAD SPECTRUM CDMA SYSTEM

(75) Inventors: June Chul Roh; Yang Ho Choi; Hyun Myung Pyo, all of Seoul (KR)

(73) Assignee: Korea Telecom, Seoul (KR)

( * ) Notice: Subject to any disclaimer, the term of this patent is extended or adjusted under 35 U.S.C. 154(b) by 0 days.

(21) Appl. No.: 09/038,795

(22) Filed: Mar. 13, 1998

(30) Foreign Application Priority Data

Mar. 13, 1997 (KR) ..................................... 97-8533

(51) Int. Cl.[7] ........................................................ H04J 1/16
(52) U.S. Cl. .................................................................. 370/342
(58) Field of Search ..................................... 370/342, 479, 370/310, 311, 318, 320, 328, 335, 441, 442, 522; 375/130, 134

(56) References Cited

U.S. PATENT DOCUMENTS 6,101,168 * 8/2000 Chen et al. ............................ 370/342
6,101,179 * 8/2000 Soliman ................................ 370/342

* cited by examiner

Primary Examiner—Dang Ton
(74) Attorney, Agent, or Firm—Staas & Halsey LLP

(57) ABSTRACT

An apparatus for spreading the information signals in a CDMA (Code Division Multiple Access) system supporting various information rates, and more particularly, to an apparatus for selecting a channel-separating and PN (Pseudo-random Noise) spreading method according to the rate of the symbol to spread. One channel-separating and/or PN spreading method is selected from two different spreading methods according to a condition among the symbol rate, the length of the orthogonal code, and the chip rate. One spreading method is to use an orthogonal code and the long PN code with a fixed time offset as the channel-separating and the PN spreading code, respectively. The other is to use the long code with different time offset for each channel as the channel-separating and/or PN spreading code. The spreading method gives lots of flexibility in system design and also reduces the multiple access interference among channels with a certain rate.

5 Claims, 3 Drawing Sheets

APPARATUS FOR SUPPORTING A VARIETY OF TRANSMISSION RATES IN SPREAD SPECTRUM CDMA SYSTEM

BACKGROUND OF THE INVENTION

1. Field of the Invention

The present invention relates to an apparatus for spreading the information signals in a CDMA (Code Division Multiple Access) system supporting various information rates, and more particularly, to an apparatus for selecting a channel-separating and a PN (Pseudo-random Noise) spreading method according to the rate of the symbol to spread.

2. Description of Related Art

In DS-CDMA (Direct sequence CDMA) systems, there are two different channel spreading methods, one of which is to spread the signal with different codes from one another, the other of which is to use one long PN code with different time offsets. The conventional CDMA systems have used one of these methods and a combination thereof.

The conventional CDMA system, as developed by QUALCOMM Incorporated, has used the first method to separate the forward channels in the same cell or sector. In other words, the Sync Channel, the Paging Channels and the Traffic Channels of the forward link are spread and separated by the orthogonal Walsh functions with distinct indexes. In the case of a single-path ideal channel and one cell environment, interference between the channels does not exist because of the orthogonal property of the Walsh functions.

In the real mobile radio channel, there is multiple access interference (MAI) between the channels even though the orthogonal sequences are used because the multipath fading characteristics of the channel lead to distortion of the signal. However, the MAI, which is caused by the fading effect of the channel, is still lower than that in the case of channel-separation with non-orthogonal sequences.

In the conventional CDMA systems, the second method above has been used to identify a forward CDMA channel from the adjacent cells or sectors. PN binary codes are used to distinguish signals received at a mobile station from different base stations. All CDMA signals in the system share a quadrature pair of PN codes. Signals from different cells or sectors are distinguished by time offset from the basic code. This relies on the property of PN codes that the autocorrelation averages to zero for all the time offsets greater than a single code chip time.

The conventional CDMA systems that provide voice-based services have a small number of data rates so it is natural to make the channels to be orthogonal using orthogonal sequences. The channel-separation and PN spreading of the traffic channel in the conventional CDMA systems is shown in FIG. 1. A traffic information bit is input into a traffic channel that passes through a channel encoder, such as a convolutional encoder 11, a symbol repeator 12 and a block interleaver 13, in this order. Thereafter, the output symbols from the block interleaver 13 are spread in an orthogonal spreader 14 by a Walsh function with an index allocated to the channel during the call setup procedure and the output from the orthogonal spreader 14 is spread in the pilot PN spreader 15 and 16 (I channel and Q channel), respectively, by the pilot codes with a time offset which is allocated to the corresponding cell or sector. All the forward channels within one cell or sector share a pair of pilot PN codes with the same time offset.

One of the typical multiple accesses applied to the mobile communication systems is the CDMA communication system. In IS-95, a CDMA common air-interface (CAI) adopted in the United States as a cellular and personal communications service (PCS) standard, the forward channels in one cell or sector are spread by the Walsh functions as channel-separating orthogonal codes and a pair of PN sequences of period $2^{15}$ with a given time offset as pilot PN codes. Therefore, there is a little intra-cell interference at a mobile station because all the forward channels can be spread with orthogonal sequences and transmitted synchronously.

However, in the systems in which the Walsh functions are used, it is difficult to transmit information data with various rates because of the relationship between the symbol rate at the input to the orthogonal spreader and the chip rate at the output of the PN spreader. That is, one symbol at the input to the orthogonal spreader should be spread with one or more periods of the Walsh sequence to guarantee orthogonality at the demodulator of the mobile receiver.

A spreading method, which uses the long codes only for channel-separation without orthogonal spreading, is considered to support a variety of rates of user information. This method gives a lot of flexibility in system design, but there is no orthogonality between the channels even among the channels satisfying the above Walsh condition, which lowers the bit error performance.

SUMMARY OF THE INVENTION

An object of the present invention is to provide an apparatus for spreading the information signals that is capable of supporting various information rates.

Another object of the present invention is to provide an apparatus for reducing the interference in a specific rate in a CDMA system.

In accordance with an aspect of the present invention, there is provided an apparatus for spreading information signals in a CDMA system supporting various information rates, comprising: a first data path for transmitting traffic data from users; at least one orthogonal spreading means formed on the first data path for spreading the traffic data using an orthogonal code; a second data path for by-passing the first data path; control means for controlling a data transmission path by selecting one of the first and the second data paths in response to a digital bit rate, a length of an orthogonal code and a chip rate, wherein the control means selects the first data path to spreading the traffic data through the orthogonal spreading means if a product of the digital bit rate and the length of the orthogonal code is equal to the chip rate, and, if not, the control means selects the second data path to spread the traffic data; and a long PN code generating means for spreading an output from the orthogonal spreading means using a long PN code having a fixed code offset when the first data path is selected or for directly spreading the traffic data using a long PN code having different code offsets when the second data path is selected.

In accordance with another aspect of the present invention, there is provided an apparatus for spreading information signals in a CDMA system supporting various information rates, comprising: switching control means for receiving a digital bit rate, a length of an orthogonal code and a chip rate, and for generating first and second control signals, wherein the switch control means generates the first control signal if a product of the digital bit rate and the length of the orthogonal code is equal to the chip rate, and, if not, the switch control means generates the second control signal; at least one orthogonal spreading means for spreading the received traffic data using an orthogonal code; first switching means for transferring the traffic data to the orthogonal spreading means in response to the first control signal; second switching means for selectively transferring the traffic data or an output from the orthogonal spreading means in response to the second control signal; a first long PN code generating means for generating a long PN code having a fixed code offset or different code offsets; and a first logic gate for EX-ORing an output from the orthogonal spreading means and the long PN code having the fixed code offset or EX-ORing the traffic data directed input and the long PN code having the different code offsets in response to the second control signal.

In accordance with further another aspect of the present invention, there is provided an apparatus for spreading information signals in a CDMA system supporting various information rates, comprising: first means for determining whether a digital bit rate input into a user channel satisfies a given condition; second means for spreading traffic data using an orthogonal code and along PN code having a fixed code offset, if the digital bit rate satisfies the given condition, after a base station notifies a mobile station of a mode to be used on a traffic transmitting channel, the index of the Walsh function and the fixed code offset of the long PN code via a control channel during the call setup procedure; and third means for spreading a traffic data using a long PN code having different code offsets, if the digital bit rate does not satisfy the given condition, after a base station notifies a mobile station of a mode to be used on a traffic transmitting channel and the different code offsets of the long PN code via a control channel during the call setup procedure.

BRIEF DESCRIPTION OF THE DRAWINGS

Other objects and aspects of the present invention will become apparent from the following description of the embodiments with reference to the accompanying drawings, in which.

DETAILED DESCRIPTION OF THE PREFERRED EMBODIMENTS

Hereinafter, the present invention will be described in detail referring to the accompanying drawings.

Figure 1:
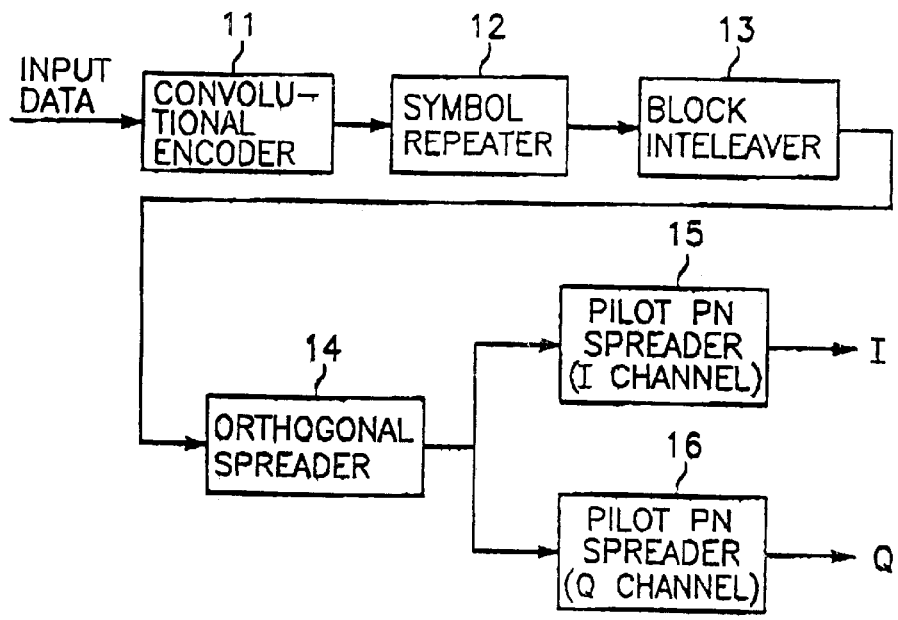
FIG. 1 is a block diagram illustrating a conventional spread spectrum in a CDMA mobile communication system.
Figure 2:
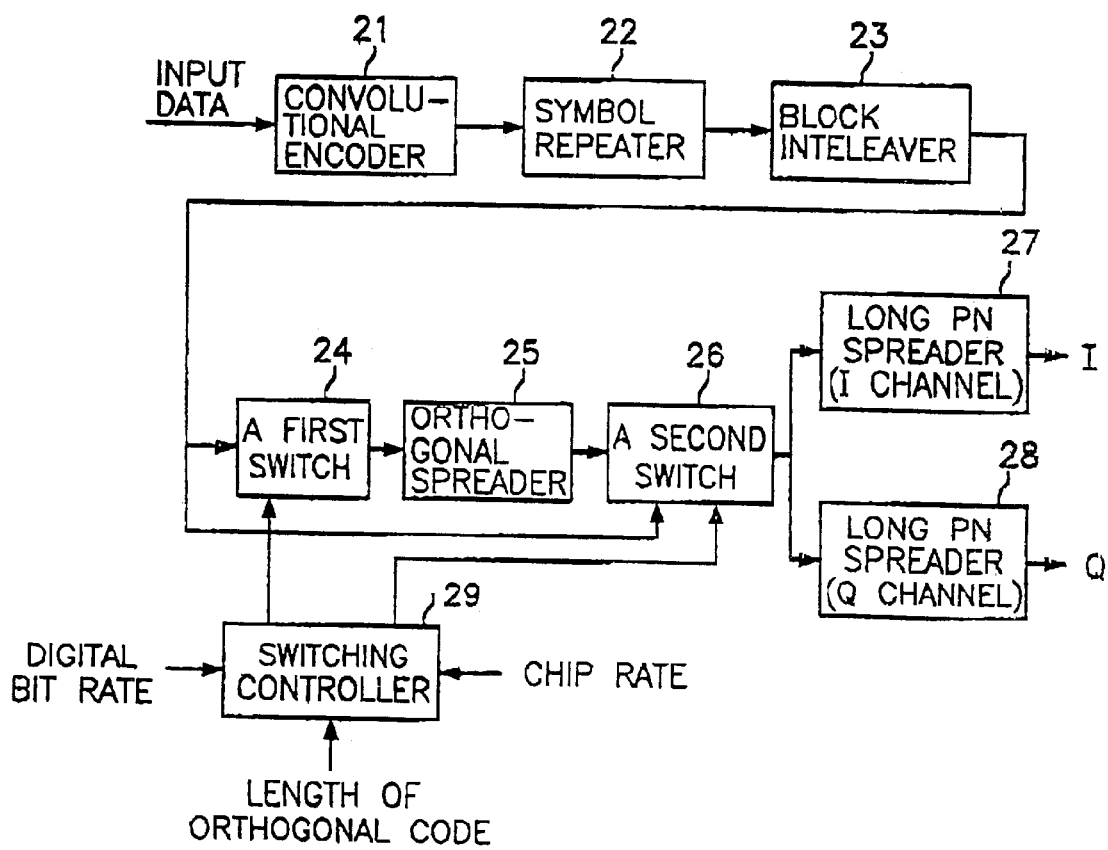
FIG. 2 is a block diagram illustrating the spreading method in a CDMA system in accordance with the present invention.

First, FIG. 2 is a block diagram illustrating a spreading method is a CDMA system in accordance with the present invention, in which the reference numeral 21 denotes a convolutional encoder, 22 a symbol repeater, 23 a block interleaver, 24 a first switch, 25 an orthogonal spreader, 26 a second switch, 27 and 28 long PN spreaders, and 29 a switching controller, respectively.

The transmitter for the forward traffic channel of a CDMA system is shown in FIG. 2. The traffic data on the traffic channel passes through a channel encoder, such as the convolutional coder 21, the symbol repeater (or scrambler) 22 and the block interleaver 23, in this order.

Next, the switch controller 29 receives from an external circuit a digital bit rate, the length of an orthogonal code and a chip rate. At this time, if the product of the digital bit rate and the length of the orthogonal code is equal to the chip rate, the switch controller 29 controls the first and the second switches 24 and 26 and spreads the traffic data through an I channel and a Q channel in the long PN spreaders 27 and 28, respectively, after spreading the traffic data in the orthogonal spreader 25 using the Walsh function of an index allocated during the call setup procedure. In this case, the PN spreading is carried out by the long codes having a fixed time offset allocated to the corresponding cell or sector.

On the other hand, if the product of the digital bit rate and the length of the orthogonal code is not equal to the chip rate, the switch controller 29 controls the first and the second switches 24 and 26 so that the switch controller 29 spreads the traffic data through an I channel and a Q channel in the long PN spreaders 27 and 28, respectively. However, the spreading of the traffic data is not performed in the orthogonal spreader 25. In the case, this spreading of the traffic data is carried out by the long PN code having different code offsets allocated to each channel.

As mentioned above, each of the channels is spread and separated by on of two modes in transmitting the data. That is to say, in the first mode, the traffic data is spread by the long PN codes with a fixed time offset allocated to the corresponding cell or sector after the orthogonal spreading using the Walsh sequence allocated to the channel. In the second mode, the traffic data is spread by the long codes having different time offsets allocated to each channel without the orthogonal spreading through the orthogonal spreader 25.

The selection of the modes may be determined by the traffic data rate and a base station notifies a mobile station of the selected mode to be used in the traffic channel transmission. Further, in the case of the first mode, the index of the Walsh function and the fixed (the same) code offset of the long PN codes are also notified to the mobile station by the base station together with the mode to be used and, in the second mode, the different code offsets of the long PN code are also notified to the mobile station by the base station together with the mode to be used.

The long PN codes of the present invention are used as channel-separating and/or PN spreading codes, but not just the Pilot codes of the cell or sector as in the conventional systems. The polynomials for these codes are all the same within the system. As spreading codes of the Pilot Channel and the Sync Channel, short period codes, such as Gold codes and Kasami codes, can be allocated to each of the cells or sectors. The channels, which pass through both the orthogonal spreader and the long code spreader, are channel-separated by the orthogonal codes different from one another and spread again by long codes having a fixed time offset. The channels, which pass through the long code spreader only, are spread by the long codes having different time offsets.

Figure 3:
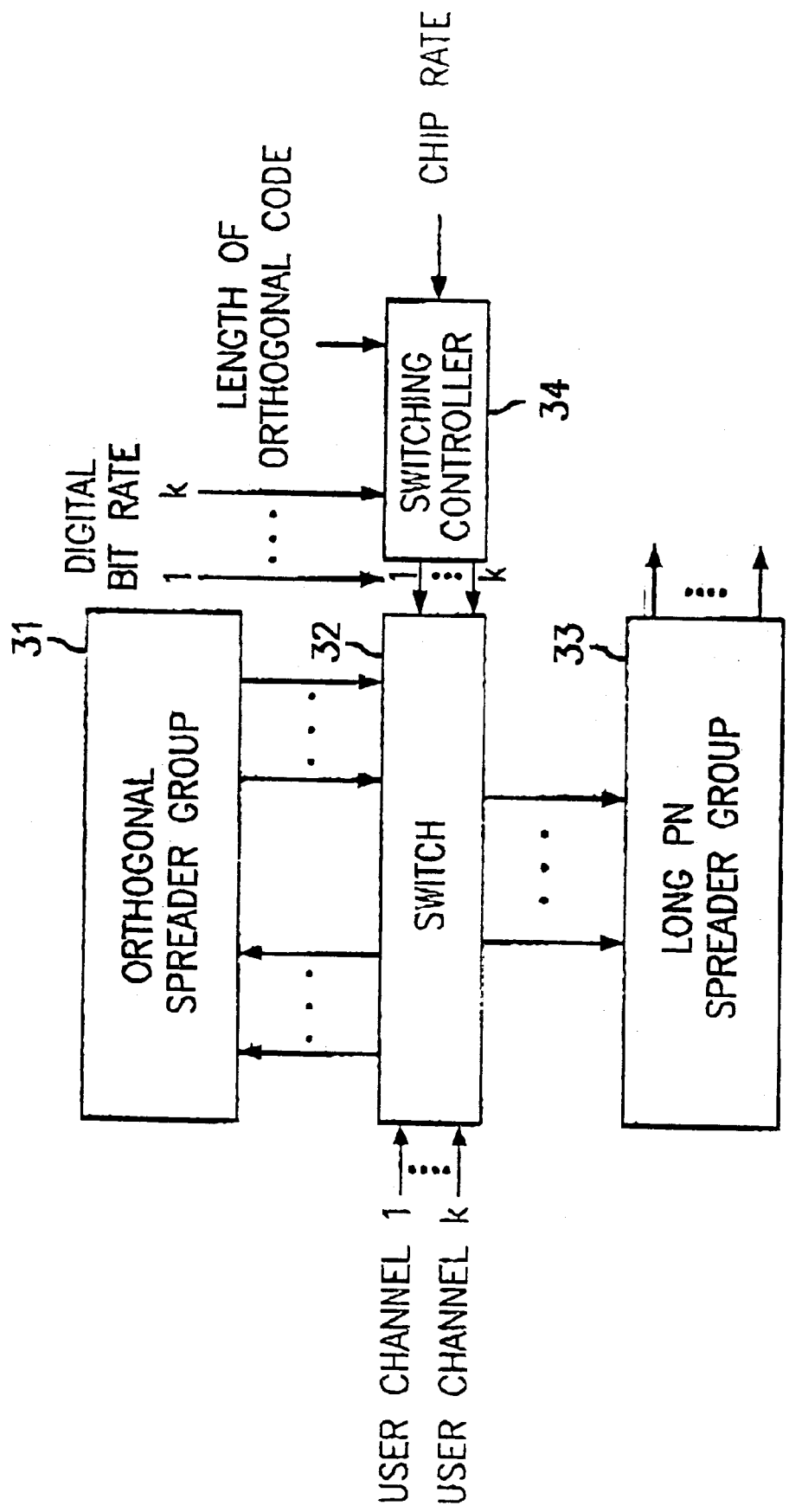
FIG. 3 is a block diagram illustrating the spreader bank in a CDMA system in accordance with the present invention.

FIG. 3 is a block diagram illustrating a spreader bank in a CDMA system in accordance with the present invention. As shown in FIG. 3, a switching controller 34 receives from an external circuit a digital bit rate, the length of an orthogonal code and a chip rate. If the product of the digital bit rate and the length of the orthogonal code is equal to the chip rate, the switching controller 34 inputs the user data into an orthogonal spreader group 31 by controlling a switch 32. After performing the spreading using the orthogonal code in the orthogonal spreader group 31, the switching controller 34 controls the switch 32 so that the output from the orthogonal spreader group 31 is switched to a long PN spreader group 33. The long PN spreader group 33 performs the spreading using the long code having the fixed code offset and outputs the result of the spreading.

On the other hand, if the product of the digital bit rate and the length of the orthogonal code is not equal to the chip rate, the switch controller 34 switches the traffic data to the long PN spreader group 33. The long PN spreader group 33 performs the spreading using the long code having the different code offsets and outputs the result of the spreading.

As described above, by directly switching the traffic data to the long PN spreader group 33, the number of required orthogonal spreaders may be less than that of a user channel.

Figure 4:
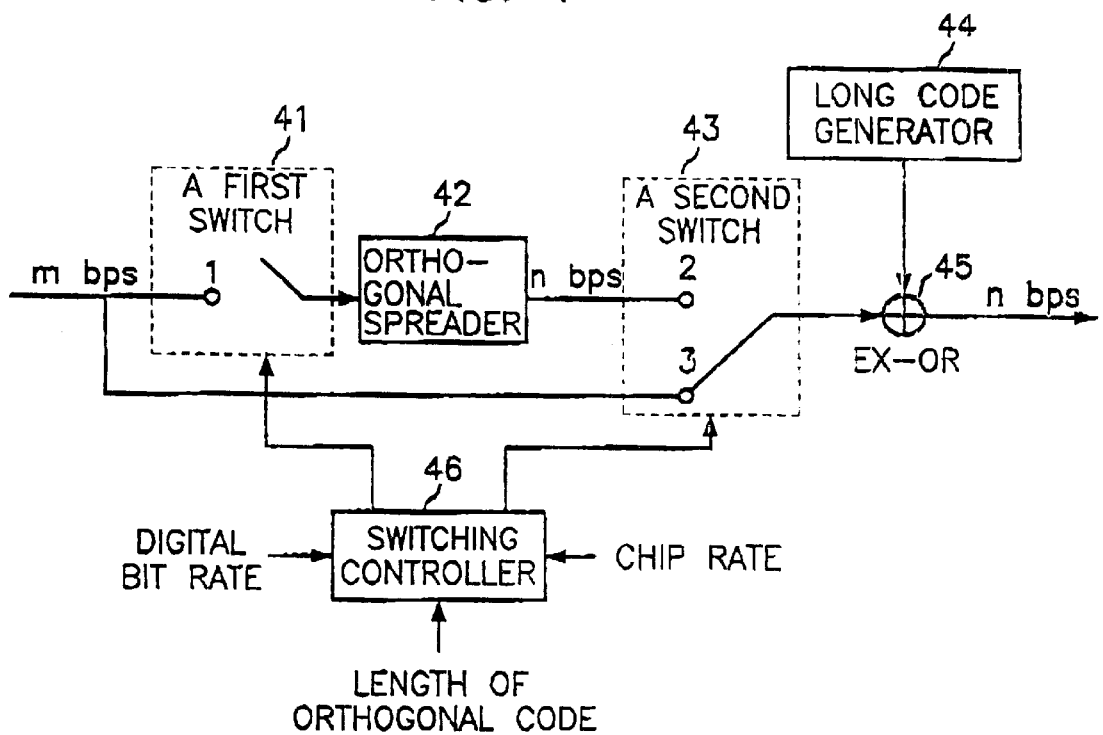
FIG. 4 is a block diagram illustrating an example of the spreader of FIG. 3.

FIG. 4 is a block diagram illustrating an example of the spreader of FIG. 3. Also, in the case of the BPSK (binary phase shift keying) data modulation and the BPSK PN spreading, FIG. 4 shows the connection between the orthogonal spreader and the long code spreader. We will assume that the digital bit rate is "m" bps, the chip rate is "n" bps and the length of the orthogonal code is "a", where the length of the orthogonal code "a" is a variable and all the code words of such variable length have the orthogonal characteristics therebetween.

Referring again to FIG. 4, a switching controller 46 receives from an external circuit a digital bit rate, the length of an orthogonal code and a chip rate. If the product of the digital bit rate and the length of the orthogonal code is equal to the chip rate, the switching controller 46 outputs a first switch control signal to a first switch 41. If not, the switching controller 46 outputs a second switch control signal to a second switch 43.

The first switch 41 is connected to the connection point 1 in response to a first control signal from the switching controller 46 so that the user traffic data is input into an orthogonal spreader 42. The orthogonal spreader 42 receiving the user traffic data through the first switch 41 performs the spreading using the orthogonal code and outputs the result of the spreading to a second switch 43.

When a second control signal is not received from the switching controller 46, the second switch 43 is connected to the connection point 2 so that the output from the orthogonal spreader 42 is input into an exclusive OR gate (EX-OR gate) 45. If the second control signal is received from the switching controller 46, the second switch 43 is connected to the connection point 3 so that the user traffic data is input into the EX-OR gate 45.

A long code generator 44 generates the long code having the fixed code offset of the different code offsets and outputs the generated long code to the EX-OR gate 45. The EX-OR gate 45 performs the logic operation for ORing the output from the orthogonal spreader 42 and the long PN code having the fixed code offset or EX-ORing the user traffic data and the long PN code having the different code offsets.

At this time, the time offset of the long code is fixed to the cell/selector-specific time offset and the channel-separation is achieved by the orthogonal code. And in the case that the orthogonal spreading is bypassed, a time offset specific to the channel is used for the long code spreading.

Figure 5:
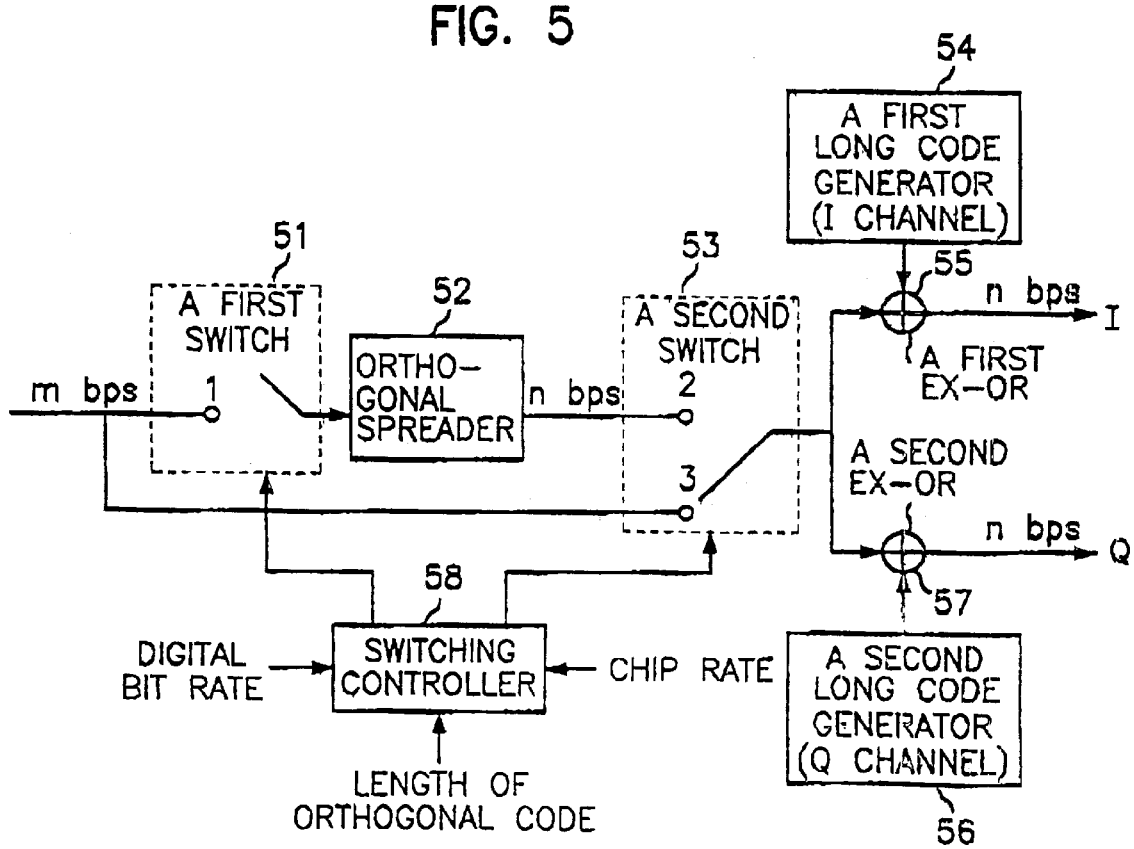
FIG. 5 is a block diagram illustrating another example of the spreader of FIG. 3.

FIG. 5 is a block diagram illustrating another example of the spreader of FIG. 3. As illustrated in FIG. 4, in the case of the BPSK data modulation and the QPSK PN spreading, the connection between the orthogonal spreader and the long code spreader is shown in FIG. 5. Likewise, we will assume that the digital bit rate is "m" bps, the chip rate is "n" bps and the length of orthogonal code is "a", where the length of orthogonal code "a" is variable and all the code words of such variable length have the orthogonal characteristics between.

If a first switch 51 receives a first control signal from a switching controller 58, it is connected to the connection point 1 so that the user traffic data is input into an orthogonal spreader 52. The orthogonal spreader 52 receiving the user traffic data through the first switch 51 performs the spreading using the orthogonal code and outputs the result of the spreading to a second switch 53.

When a second control signal is not received from the switching controller 58, the second switch 53 is connected to the connection point 2 so that the output from the orthogonal spreader 52 is input into first and second EX-OR gates 55 and 57. If the second control signal is received from the switching controller 58, the second switch 53 is connected to the connection point 3 so that the user traffic data is input into the first and second EX-OR gates 55 and 57.

A first long code generator 54 generates the long code, which has the fixed code offset or the different code offsets, and outputs the generated long code to the first EX-OR gate 55. In such a manner, a second long code generator 56 generates the long code, which has the fixed code offset or the different code offsets, and outputs the generated long code to the second EX-OR gate 57.

The first EX-OR gate 55 performs the logic operation for EX-ORing the output from the orthogonal spreader 52 and the long PN code having the fixed code offset from the first long code generator 54 or EX-ORing the user traffic data and the long PN code having the different code offsets from the first long code generator 54. The output from the first EX-OR gate 55 is output through the I channel.

In such a manner, the second EX-OR gate 57 performs the logic operation for EX-ORing the output from the orthogonal spreader 52 and the long PN code having the fixed code offset from the second long code generator 56 or EX-ORing the user traffic data and the long PN code having the different code offsets from the second long code generator 56. The output from the first EX-OR gate 57 is output through the Q channel.

At this time, the time offset of the long codes (I and Q channel) is fixed to the cell/sector-specific time offset and the channel-separation is achieved by the orthogonal code. And in the case that the orthogonal spreading is bypassed, a time offset specific to the channel is used for the long code spreading.

What is claimed is:

1. An apparatus for spreading information signals in a CDMA system supporting various information rates, comprising:

a first data path transmitting traffic data from users;

at least one orthogonal spreading means formed on the first data path for spreading the traffic data using an orthogonal code;

a second data path for by-passing the first data path;

control means for controlling a data transmission path by selecting one of the first and the second data paths in response to a digital bit rate, a length of an orthogonal code and a chip rate, wherein the control means selects the first data path to spread the traffic data through the orthogonal spreading means if a product of the digital bit rate and the length of the orthogonal code is equal to the chip rate, and, if not, the control means selects the second data path to spread the traffic data; and long PN code generating means for spreading an output from the orthogonal spreading means using a long PN code having a fixed code offset when the first data path is selected or for directly spreading the traffic data using a long PN code having different code offsets when the second data path is selected.

2. An apparatus for spreading information signals in a CDMA system supporting various information rates, comprising:

switching control means for receiving a digital bit rate, a length of an orthogonal code and a chip rate, and for generating first and second control signals, wherein the switching control means generates the first control signal if a product of the digital bit rate and the length of the orthogonal code is equal to the bit rate, and, if not, the switching control means generates the second control signal;

at lease one orthogonal spreading means for spreading the received traffic data using an orthogonal code;

first switching means for transferring the traffic data to the orthogonal spreading means in response to the first control signal;

second switching means for selectively transferring the traffic data or an output from the orthogonal spreading means in response to the second control signal;

first long PN code generating means for generating a first long PN code having a fixed code offset or different code offsets; and a first logic gate for EX-ORing an output from the orthogonal spreading means and the first long PN code having the fixed code offset or EX-ORing the traffic data directed input and the first long PN code having the different code offsets in response to the second control signal.

3. The apparatus in accordance with claim 2, wherein the apparatus further comprises:

second long PN code generating means for generating a second long PN code having a fixed code offset or different code offsets; and a second logic gate for EX-ORing an output from the orthogonal spreading means and the second long PN code having the fixed code offset or EX-ORing the traffic data directed input and the second long PN code having the different code offsets in response to the second control signal.

4. An apparatus for spreading the information signals in a CDMA system supporting various information rates, comprising:

first means for determining whether a digital bit rate input into a user channel satisfies a given condition;

second means for spreading traffic data using an orthogonal code and a long PN code having a fixed code offset, if the digital bit rate satisfies the given condition, after a base station notifies a mobile station of a mode to be used on a traffic transmitting channel, an index of a Walsh function and the fixed code offset of the long PN code via a control channel during a call setup procedure; and third means for spreading traffic data using a long PN code having different code offsets, if the digital bit rate does not satisfy the given condition, after the base station notifies the mobile station of the mode to be used on the traffic transmitting channel and the different code offsets of the long PN code via a control channel during the call setup procedure.

5. The apparatus in accordance with claim 4, wherein the given condition is to determine whether a product of the digital bit rate and a length of an orthogonal code is equal to a chip rate.

* * * * *